United States Patent [19]
Aridas et al.

[11] Patent Number: 5,644,719
[45] Date of Patent: Jul. 1, 1997

[54] INTERPROCESS COMMUNICATION APPARATUS INTERPOSED BETWEEN APPLICATION PROCESSES AND THE OPERATING SYSTEMS OF HOSTING COMPUTERS IN A SYSTEM OF NETWORKED COMPUTERS

[75] Inventors: James Aridas; Judith L. Culpepper; Tijen Ireland; Pope P. Trinidad, all of Virginia Beach; Sherman R. White, Jr., Newport News, all of Va.

[73] Assignee: Unisys Corporation, Blue Bell, Pa.

[21] Appl. No.: 358,221

[22] Filed: Dec. 16, 1994

[51] Int. Cl.$^6$ .............................. G06F 13/14; G06F 13/42
[52] U.S. Cl. .................. 395/200.12; 395/200.01; 395/200.02
[58] Field of Search .................. 395/200.01, 200.02, 395/200.12; 364/240.8, 940.81

[56] References Cited

U.S. PATENT DOCUMENTS

| | | | |
|---|---|---|---|
| 5,329,619 | 7/1994 | Page et al. | 395/200 |
| 5,452,433 | 9/1995 | Nihart et al. | 395/500 |
| 5,491,822 | 2/1996 | Allen et al. | 395/700 |
| 5,519,863 | 5/1996 | Allen et al. | 395/650 |
| 5,519,875 | 5/1996 | Yokoyama et al. | 395/800 |

*Primary Examiner*—Meng-Ai T. An
*Assistant Examiner*—Richard J. Gregson
*Attorney, Agent, or Firm*—Albert B. Cooper; Mark T. Starr

[57] ABSTRACT

In a network of computers having different operating systems with different message transport mechanisms, an interprocess communication layer (IPC) is interposed between applications hosted on the computers and the operating systems thereof. IPC presents a consistent interface to the application processes for message transport therebetween while linking to the intracomputer and intercomputer message transport mechanisms of the operating systems and the network. A process desiring to send or receive messages registers through a REGISTER function passing its system name and process identification (PID) assigned by the operating system to the process. To send a message, a process calls a SEND function passing the system name and system address of the recipient process. IPC attaches the recipient process PID to a message to be delivered. A process receives a message by invoking a RECEIVE function to receive its messages from the intracomputer communication mechanism of the host computer identified by the PID of the recipient process.

12 Claims, 4 Drawing Sheets

INTERPROCESS COMMUNICATION APPARATUS INTERPOSED BETWEEN APPLICATION PROCESSES AND THE OPERATING SYSTEMS OF HOSTING COMPUTERS IN A SYSTEM OF NETWORKED COMPUTERS

CROSS REFERENCE TO RELATED APPLICATIONS

The present invention is particularly suitable for use in the system disclosed in U.S. patent application Ser. No. 08/344,316 filed Nov. 22, 1994, now U.S. Pat. No. 5,579,371, entitled "Common Channel Signaling Network Applications Platform", by James Aridas, et al. Said Ser. No. 08/344,316 is assigned to the assignee of the present invention and is incorporated herein in its entirety.

BACKGROUND OF THE INVENTION

1. Field of the Invention

The invention relates to systems of networked computers particularly with respect to transporting messages between application processes residing on the computers.

2. Description of the Prior Art

In systems comprising networked computers, message transport mechanisms exist for intracomputer and intercomputer transport of messages between application processes of applications running on, or distributed, across the computers. UNIX based computers (e.g., UNIX System V Release 4.0 (SVR4)) utilize message queues for intracomputer communication and remote message transport procedures for intercomputer message communication. In UNIX SVR4, application processes are given process IDs and are assigned respective queues from which to receive messages. A process desiring to send a message to another process on the same computer must obtain the name of the queue assigned to the recipient process.

Other computers may utilize a multicomputer architecture where message communication is performed across a backplane utilizing a high performance bus system such as MultiBus II. In such a system, addressed messages are placed on the bus and are retrieved by recipient processes communicating with the bus.

Intercomputer message communication may be effected by such communication interfaces as TCP/IP, SCSI, or the like.

Pursuant to the intracomputer and intercomputer communication systems utilized, the applications running on the computers include interprocess communication procedures that typically are specific to the underlying protocols, formats and structures of the intercomputer and intracomputer communication mechanisms of the system. The protocols, formats and structures required by different machines on the network may be different with respect to each other and the applications would be required to be aware of these differences for interprocess communication. For example, in UNIX based computers, the applications must all be aware of the message queue assignment agreements effected between the processes. Additionally, the application communication procedure typically must have explicit knowledge of the destination, such as the physical location of the recipient process, i.e., whether it is on the same or a different machine from the originating process, if on a different machine, what is the intercomputer transport mechanism, and the like.

This arrangement requires each application to carry a significant interprocess communication overhead which must be duplicated each time a new application is introduced to the system. The problems are further exacerbated when applications are distributed over multiple computers of the system of diverse types.

The interprocess communication problem is particularly serious in a networked system of computers that form a platform such as described in said Ser. No. 08/344,316. The platform system of Ser. No. 08/344,316, now U.S. Pat. No. 5,579,371, supports concurrently running diverse applications relating to the Common Channel Signaling (CCS) network. The interprocess communication problems described above could seriously impact on the efficacy of the system as a platform if it were required to write each new application specifically for connection with the underlying message transport mechanisms of the platform. Considerable application modification would be required if it were desired to add computers to the underlying platform or change to computers having message transport mechanisms different from those already existing with respect to the machines of the platform.

SUMMARY OF THE INVENTION

The above disadvantages of the prior art are obviated by interposing an interprocess communication (IPC) structure between the application processes and the underlying intracomputer and intercomputer message transport mechanisms of the computers and processors of the network. The IPC is structured to provide a consistent interface to the application processes permitting the application processes to communicate in a consistent manner with each other independent of the machine environment hosting the applications. IPC permits application processes to communicate with each other without determining the physical locations of recipient processes.

The system in which IPC is utilized includes a plurality of separate inter-networked computers and processors hosting the application processes between which message transport is desired. Some of the computers may be structured with multiple processors and shared memory so that any processor can run any process hosted on the computer. Others of the computers may include multiple processors without shared memory so that a process can only run on a hosting processor. In the underlying system, System Software (SS) assigns a system address to each such independent computer or processor. The address uniquely identifies the host on which a message sending or receiving process will run. The operating systems of the computers assign process identifications (PID) to the processes hosted thereon. IPC includes IPC portions on each independent computer (processor), respectively, linked to the underlying intracomputer and intercomputer message transport mechanisms thereof utilizing the structures and protocols of these underlying mechanisms.

IPC includes a REGISTER function in which a process desiring to send or receive messages registers with its system name and the PID assigned to it by the operating system of the computer or processor on which the registering process is deployed. A process located anywhere in the networked system desiring to send a message to another process also located anywhere in the networked system sends the message to IPC using a SEND function passing the system name and address of the recipient process. IPC, using the recipient process address, determines if the process resides on the same machine or a different machine from the sending process. If on the same machine, IPC consults the registration tables and uses the underlying intracomputer communication structure with which IPC is linked to deliver the message to the recipient process in accordance with the recipient PID. If the message is destined for a remote computer, IPC uses the appropriate underlying intercomputer communication process to deliver the message to the remote computer. On the remote computer, IPC determines from the recipient process address if the process resides on the receiving machine or if the messages requires transport to a further remote machine. If the recipient process resides on the receiving machine, IPC consults the registration tables for the recipient process PID and delivers the message using the underlying intracomputer communication structure with which IPC is linked.

When a process desires to receive a message, the process invokes an IPC RECEIVE function which links to the underlying message transport mechanism of the recipient's host so that the recipient receives the messages addressed and identified to it by the message sending procedures.

DESCRIPTION OF THE PREFERRED EMBODIMENT

Figure 1:
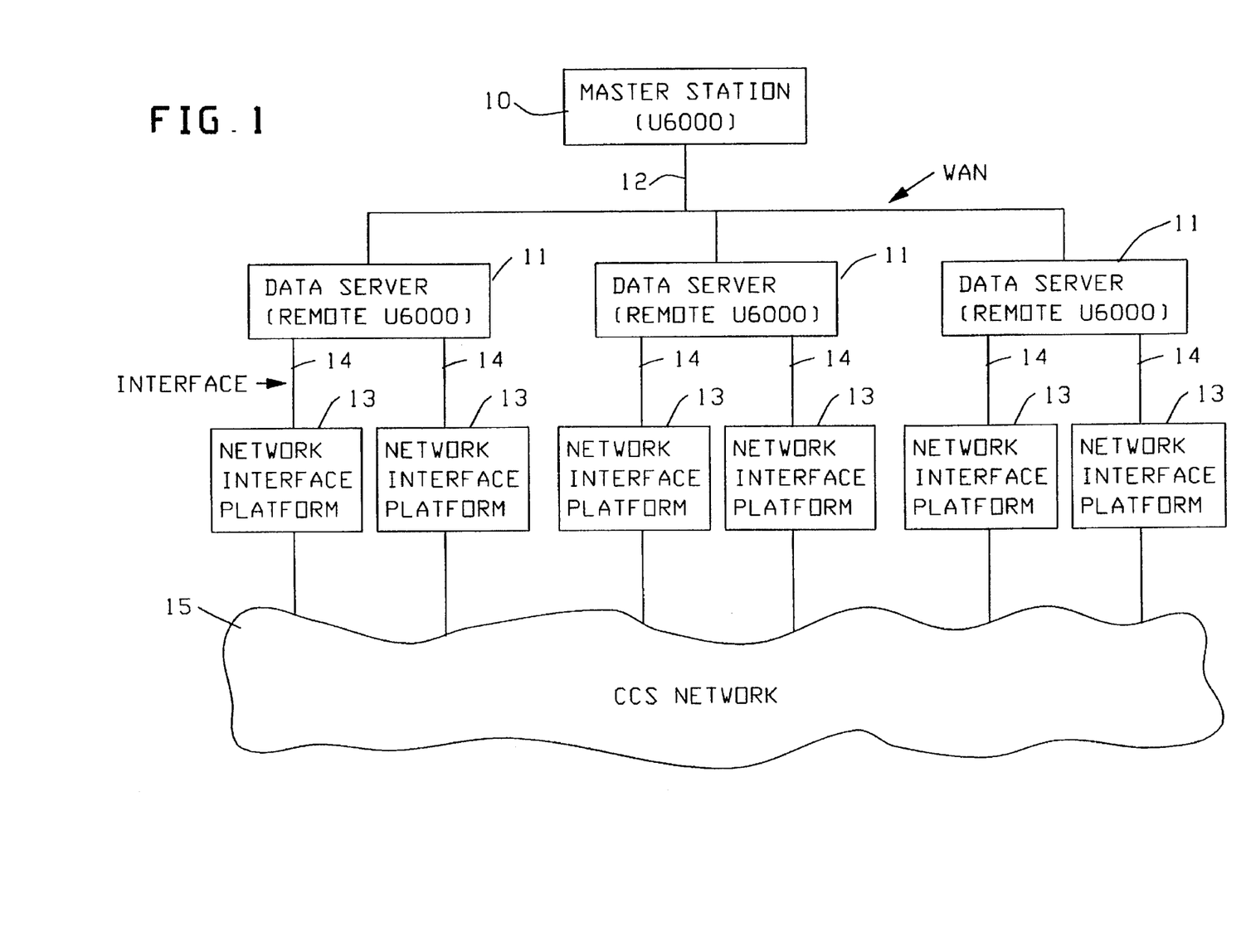
FIG. 1 is a schematic block diagram of a networked system in which the present invention may be utilized.

Referring to FIG. 1, a system of networked computers in which the present invention may advantageously be utilized is illustrated. The system of FIG. 1 is that described in said Ser. No. 08/344,316 now U.S. Pat. No. 5,579,371. The system of FIG. 1 includes a master station computer 10 and remote data server computers 11 intercoupled through a wide area network (WAN) 12 using, for example, the TCP/IP communication interface. The master station 10 and data servers 11 may be implemented by the U6000 series computer available from Unisys Corporation of Blue Bell, Pa. The network of FIG. 1 includes Network Interface Platform (NIP) computers 13 coupled to the data servers 11 through interfaces 14 which may, for example, comprise SCSI interfaces. The NIPs 13 are utilized as front end processors for coupling the system to a Common Channel Signaling (CCS) network 15. The U6000 computers 10, 11, are UNIX based machines having plural processors with shared memory. The NIP 13 may be configured utilizing plural independent processors arranged in a MultiBus II architecture. The processors of the NIP 13 may be arranged as boards in board slots communicating through a MultiBus II backplane.

The computers 10 and 11, and the processor boards of the computers 13, can host a variety of application processes that require message transport communication therebetween. For example, a process in the master station 10 may be required to send a message to a particular board in one of the NIPs 13 through a data server 11 across the interfaces 12 and 14. Similarly, message transport communication may be required by a process on a board in one of the NIP's 13 back to the master station 10. The application processes within a computer also require message transport communication therebetween. Additionally, processes in the master station 10 and in a data server 11 require communication therebetween as do processes residing on the boards of the NIPs 13 with respect to the processes in the data servers 11.

As described in said Ser. No. 08/344,316, now U.S. Pat. No. 5,579,371 the system of FIG. 1 comprises a platform for supporting concurrently running applications with diverse functionality relating to the CCS network 15. In the absence of the present invention, the platform represented by the networked system of computers of FIG. 1 would be subject to all of the disadvantages described above. The present IPC invention promotes the viability of the system of FIG. 1 as a platform for deploying a plurality of independently and concurrently running CCS type applications with diverse functionality.

Figure 2:
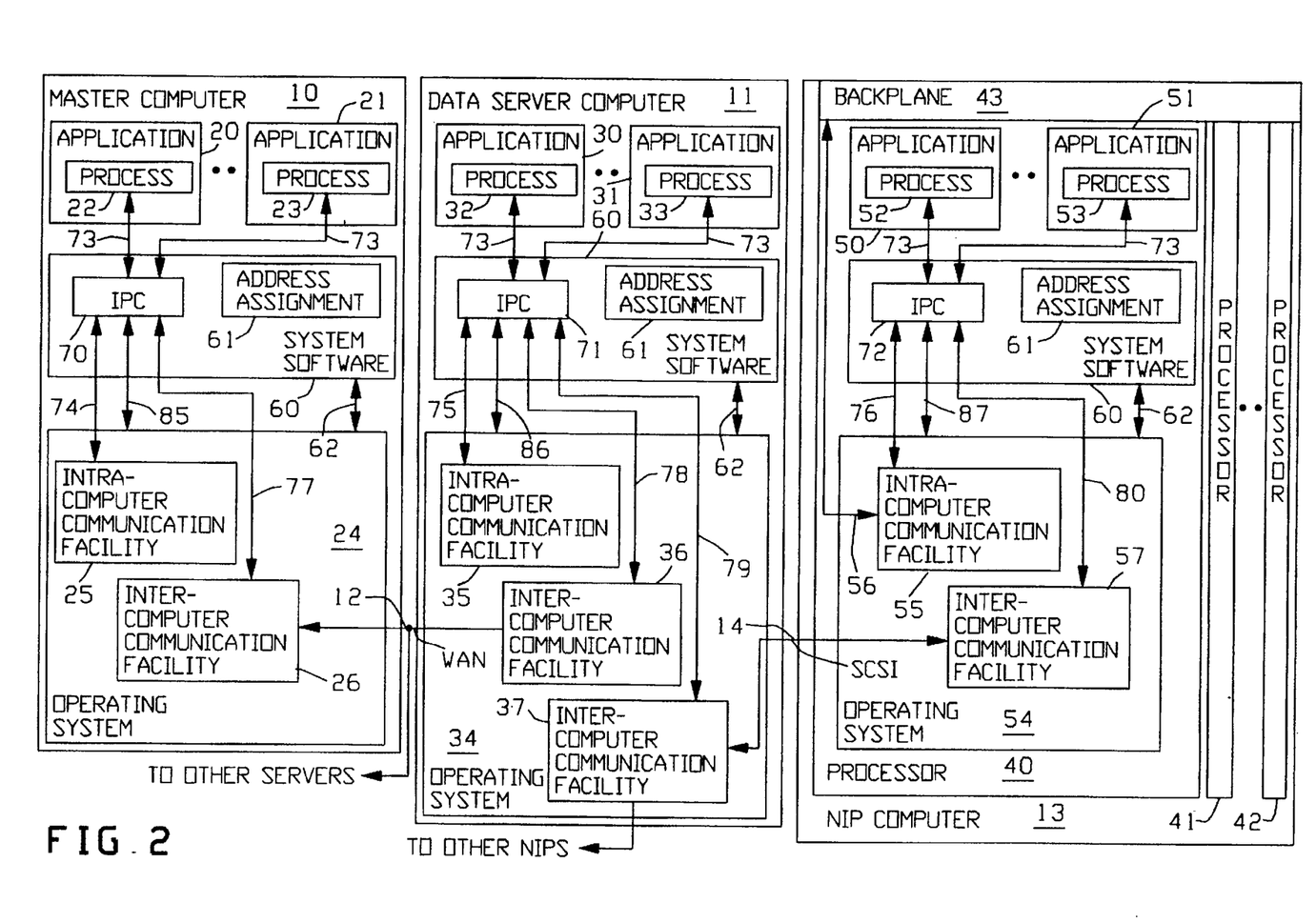
FIG. 2 is a schematic block diagram illustrating interrelationships between the IPC of the present invention and the application processes, computers and processors of the networked system of FIG. 1.

Referring to FIG. 2, in which like reference numerals indicate like components with respect to FIG. 1, further details of the components of FIG. 1 are illustrated. The master station 10 is illustrated hosting applications 20 and 21 including application processes 22 and 23, respectively. The computer 10 includes an operating system 24 which may, for example, comprise UNIX System V Release 4.0 (SVR4). The operating system 24 includes conventional intracomputer communications facility 25 which in UNIX SVR4 utilizes a message queue architecture. Conventionally, the intracomputer communication facility 25 provides interprocess message transport between processes on the computer 10, such as the processes 22 and 23. This conventional messaging in UNIX utilizes standard UNIX interfaces and protocols with respect to the UNIX message queues.

In a well-known manner, when application processes, such as processes 22 and 23, initiate on the computer 10, the UNIX operating system 24 assigns UNIX process identifications (PID) thereto which are utilized by UNIX in transporting messages between processes. The operating system 24 also includes an intercomputer communication facility 26 for providing conventional message transport between the computers 10 and 11 over the WAN 12. The intercomputer communication facility 26 may, for example, use the TCP/IP protocol.

In a manner similar to that described with respect to the computer 10, the data server computer 11 hosts applications 30 and 31 including application processes 32 and 33, respectively. The computer 11 includes an operating system 34 having an intracomputer communication facility 35. The operating system 34 also includes an intercomputer communication facility 36 for communicating over the WAN 12 with, for example, the master station 10. The computer 11 may also be UNIX based and descriptions given above with respect to elements 20–26 of the master station 10 apply as well to respective elements 30–36 of the data server 11.

The operating system 34 includes a further conventional intercomputer communication facility 37 for communicating with the NIP 13 across a high performance bus, such as the SCSI interface 14. The facility 37 is utilized for transporting messages between the server 11 and the NIP 13 across the interface 14.

In the illustrated embodiment, each of the UNIX computers 10 and 11 is a shared memory computer utilizing a plurality of processors (not shown), any one of which can perform any process on any application hosted on the computer.

The NIP computer 13 utilizes a different architecture of multiple processor boards with separate memory facilities. The processor boards of the computer 13 are represented as 40, 41 and 42. The processors 40–42 intercommunicate across a backplane 43 which may utilize any conventional high performance bus architecture, such as MultiBus II. In the disclosed embodiment, the processors 40–42 of the computer 13 do not utilize shared memory and, therefore, an application process resident on a processor is only performed on that processor.

The processor board 40 hosts applications 50 and 51 which include application processes 52 and 53, respectively. The processor 40 includes a standard operating system 54, such as the Tredyffrin Multitasking Kernel (TMK) available from Unisys Corporation of Blue Bell, Pa. TMK utilizes MultiBus II and is a UNIX-like operating system designed for small processors. The operating system 54 includes an intracomputer communication facility 55 which is a message transport facility for the processor board 40 utilizing MultiBus II. Communication with the backplane 43 is indicated by communication path 56. The operating system 54 also includes standard intercomputer communication facility 57 for supporting message transport between the data server computer 11 and the NIP computer 13 via the interface 14.

Processors 41 and 42 are configured in a manner similar to that described with respect to the processor 40 and intercommunicate therewith via the MultiBus II backplane 43.

As explained above with respect to FIG. 1, the computers 10, 11 and 13 are part of a network of computers that form a CCS platform. The platform includes system software (SS) 60 deployed on the operating systems of the computers. The system software 60 includes an address assignment function 61 that assigns a system address to each independent computer and processor. In the embodiment illustrated, each of computers 10 and 11 and processors 40–42 is assigned a unique system address. The address uniquely identifies the host upon which a message sending or receiving process will run. The address assignments are conveyed to all of the computers of the system via the intercomputer communication facilities illustrated. Communication paths 62 between the system software 60 and the operating systems represent this function.

By convention, each application process 22, 23, 32, 33, 52 and 53, is assigned a system name by the applications. No two processes on the same computer 10 or 11 or processor board 40, 41 or 42 will have the same name.

An interprocess communication (IPC) layer is interposed between the application processes 22, 23, 32, 33, 52 and 53, and the operating systems 24, 34 and 54 to obviate the disadvantages of the prior art described above. Each independent computer or processor has an IPC, as denoted by reference numerals 70, 71 and 72. It is appreciated that each of the processors 41 and 42 also includes an IPC such as that illustrated at 72 in the processor 40. The IPC 70–72 presents a consistent interface to the processes 22, 23, 32, 33, 52 and 53 for message transport, irrespective of the underlying operating systems and differing intracomputer and intercomputer communication facilities utilized. This interface is denoted by reference numeral 73. IPCs 70, 71 and 72 communicate with the intracomputer and intercomputer communication facilities 25, 26, 35, 36, 37, 55 and 57 via the communication paths illustrated and denoted by reference numerals 74–80. The IPCs 70, 71 and 72 also communicate with the operating systems 24, 34 and 54 via paths 85, 86 and 87, respectively, for accessing process PIDs for reasons to be described.

As explained above, the computers 10 and 11 have UNIX operating systems 24 and 34, whereas computer 13 has the MultiBus II based TMK operating system 54. The IPC layers 70 and 71, therefore, are designed to interface with the UNIX environment, whereas the IPC layer 72 is designed to interface with the MultiBus II environment. The IPC layers 70, 71 and 72 function as an application to the underlying operating systems 24, 34 and 54.

Figure 3:
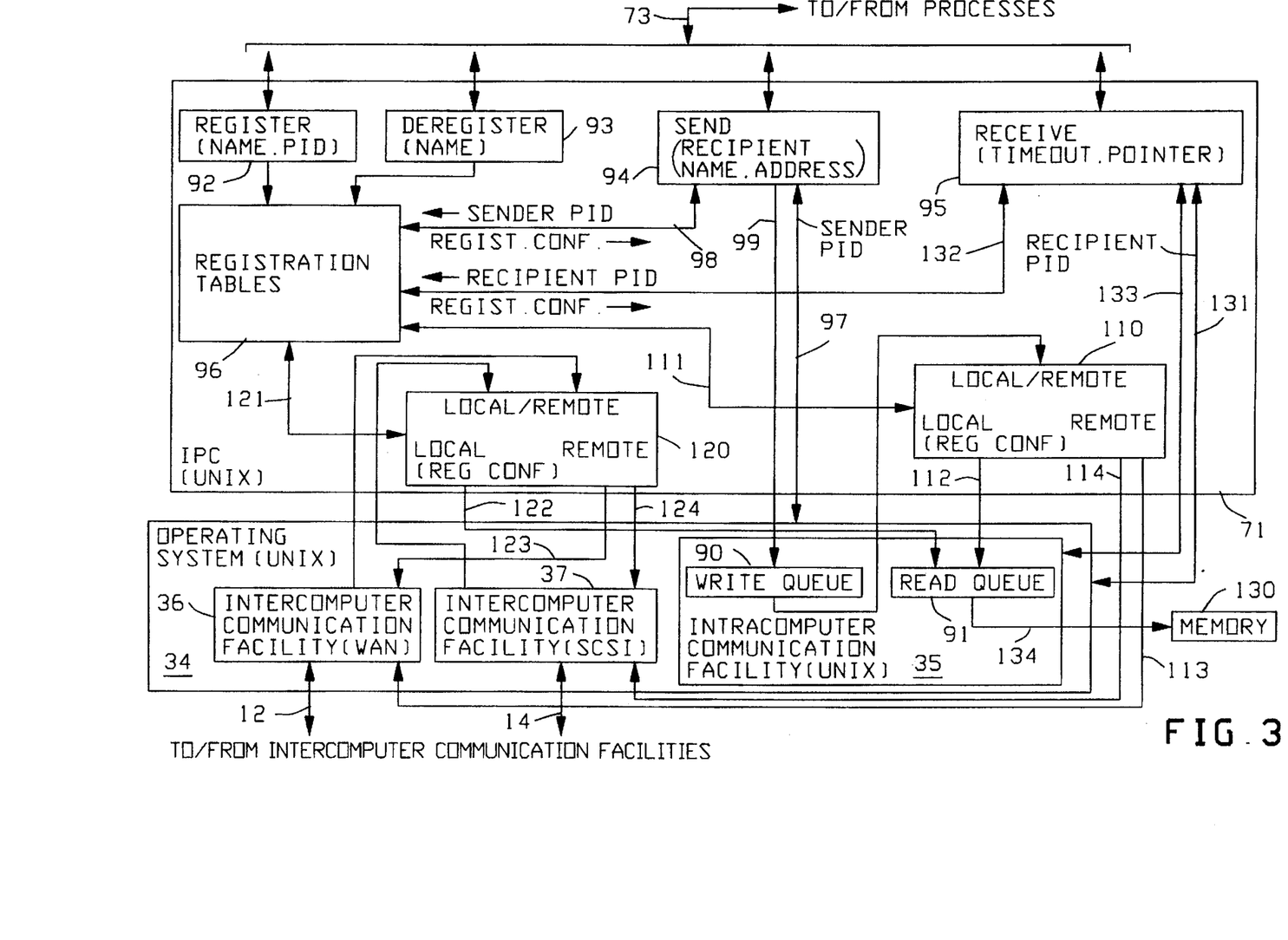
FIG. 3 is a schematic block diagram illustrating details of the IPC of FIG. 2 in an underlying message transport environment utilizing message queues such as UNIX System V Release 4.0.

Referring to FIG. 3, in which like reference numerals indicate like components with respect to FIG. 2, and with continued reference to FIG. 2, details of the IPC 71 of the computer 11 are illustrated. It is appreciated that the IPC 71 is substantially the same as the IPC 70 of the master station computer 10 and the discussion of IPC 71 also applies to IPC 70.

IPC 71 reserves two UNIX message transport queues 90 and 91 denoted as a write queue and a read queue, respectively. The write queue 90 is utilized to initiate messages by an originating process and is the queuing mechanism for receiving message data when a message is being sent. The read queue 91 is utilized to deliver a message to a destination process and is the mechanism providing the source of a message to a recipient process. It is appreciated that two similar message queues are established in each UNIX computer of the system.

The interface 73 between the application processes and IPC 71 is via four function calls, REGISTER 92, DEREGISTER 93, SEND 94 and RECEIVE 95. The process interface 92–95 with IPC is thus consistent irrespective of the underlying computer and message transport environment.

In order to be attached to the messages queues 90 and 91 for sending or receiving messages, a process registers with IPC using the REGISTER function 92. An application process uses the REGISTER function 92 to obtain access to the message queues 90 and 91 before sending or receiving any messages. In the REGISTER function 92, the registering process passes its system name and PID. This registration information is stored in registration tables 96. When a process comes up and is expected to engage in message transport, the process registers via the function 92.

When a process terminates, it calls the DEREGISTER function 93 passing its system name thereto. The DEREGISTER function 93 deletes the process information from the registration tables 96.

When a process desires to send a message to a recipient process, the sender obtains the system name and system address of the recipient from system tables or logic (not shown). The sending process then invokes the SEND function 94 passing the recipient system name and system address thereto. The SEND function 94 consults the operating system 34 via a path 97 to obtain the PID of the sending process. The SEND function 94 then accesses the registration tables 96 via a path 98 to determine if the sender is registered with IPC. The SEND function 94 also moves the message data from the application defined data structure to a system data structure allowing the application process to reuse the buffer (not shown). Operationally, the SEND function 94 places the message to be delivered including the recipient system name and system address in the write queue 90 via a path 99 for further processing.

IPC 71 includes a local/remote function 110 that examines each message on the write queue 90 to determine if the destination is on the local computer or is on another machine. The system address of the recipient process provides this information to the function 110. If the message is addressed locally, the function 110 consults the registration tables 96 via a path 111 to verify that the recipient process is registered and to obtain the PID of the destination process affixing it to the message. The message with the destination process PID is placed on the read queue 91, as represented by a path 112.

If the destination for the message is on a remote machine, the function 110 calls the appropriate UNIX remote procedure to transport the message to the remote machine via either the intercomputer communication facility 36 or the intercomputer communication facility 37. Paths 113 and 114 denote these functions, respectively.

Incoming messages to the computer 11 (FIG. 2), are received at the facility 36 or the facility 37. These messages are passed to a local/remote function 120 that determines, by the system address of the message recipient, if the receiving process is local or is on a remote machine. If the message is local, the function 120 consults the registration tables 96 via a path 121 to confirm registration of the recipient process and, if registered, to determine its PID. The message with the destination process PID is placed on the read queue 91 via a path 122 for delivery.

If the message is destined for a remote machine, the function 120 directs it thereto utilizing the intercomputer communication facilities 36 and 37 via paths 123 and 124, respectively.

In order for a recipient process to receive a message addressed to it, the process invokes the RECEIVE function 95 passing a timeout parameter and a memory pointer thereto. The pointer designates the location in memory 130 allocated for the message by the receiving process application. The RECEIVE function 95 consults the operating system 34 via a path 131 to receive the PID of the recipient process. The RECEIVE function 95 then utilizes this PID via a path 132 to consult the registration tables 96 to confirm that the recipient process is registered. The RECEIVE process 95 then accesses the read queue 91 via the operating system 34, as denoted by reference numeral 133, to obtain the messages in the read queue 91 that have the recipient process PID attached thereto. These messages are placed in memory 130 at the location designated by the memory pointer. This function is denoted by reference numeral 134.

It is appreciated that the paths 97 and 131 comprise the path 86 of FIG. 2.

The timeout parameter indicates the maximum time that the RECEIVE function 95 will wait for a message. The timeout parameter is utilized with respect to message receiving options. A timeout value of zero causes an immediate return to the process if there are no messages pending in the read queue 91. A timeout value of MAXINT indicates that the process will wait indefinitely for a message. Timeout, therefore, provides a process with flexibility to call for a message and then go off to perform another function while it continues to wait for a message in accordance with the timeout parameter passed by the process to the RECEIVE function 95.

It is appreciated from the foregoing, that processes desiring to send and receive messages utilize the function interface represented by the SEND function 94 and the RECEIVE function 95. Except for registering and deregistering via the functions 92 and 93, the remainder of the message transport functionality depicted in FIG. 3 is substantially transparent to the application processes. The present IPC invention generically provides all of this functionality for any application added to the platform. In the prior art, an application developer designs this message transport functionality into the application.

It is appreciated that the IPC 70 (FIG. 2) is substantially identical to the IPC 71 illustrated in FIG. 3, except that the facility 37 may not be utilized.

Figure 4:
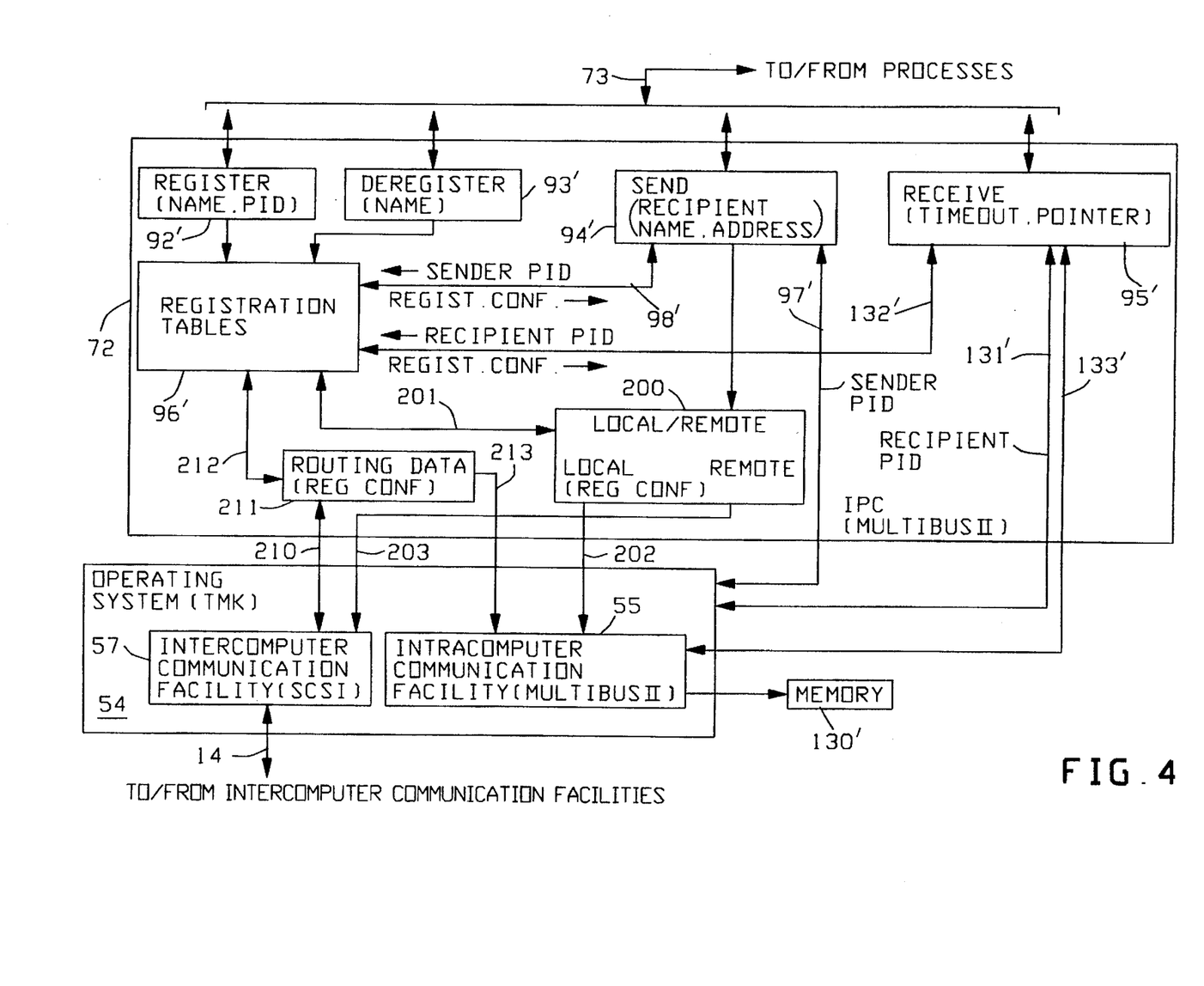
FIG. 4 is a schematic block diagram illustrating details of the IPC of FIG. 2 in an underlying message transport environment that does not use message queues such as MultiBus II.

Referring to FIG. 4, in which like reference numerals indicate like components with respect to FIG. 2, and with continued reference to FIG. 2, details of the IPC 72 of the NIP computers 13 are illustrated. The IPC 72 is configured in a manner similar to that described above with respect to the UNIX based IPC 71 of FIG. 3, except that the IPC 72 is based on a MultiBus II message transport environment. Similar functionality of FIG. 4 is denoted by reference numerals that are primed with respect to the corresponding reference numerals of FIG. 3. This functionality will not be repeated herein for brevity.

The registration process 92' utilizes functionality similar to that described above with respect to the function 92 for assigning MultiBus II IDs (PID) to the processes. These PIDs are utilized by the MultiBus II message transport system to direct the messages.

With respect to the SEND function 94', a local/remote function 200 is utilized to determine if the recipient process is on the same NIP computer 13 as the sending process, or if it is on a remote machine. If the recipient process is local, the function 200 accesses the registration tables 96' via a path 201 to confirm registration of the recipient process and to obtain its PID. If confirmed, the message with the PID of the recipient is placed on the bus via the facility 55, as indicated by reference numeral 202. The recipient process can then receive the message from the bus via the backplane 43 (FIG. 2).

If the recipient process is on a remote machine, the function 200 directs the message via a path 203 to the intercomputer communication facility 57 for routing.

Because of the architecture illustrated in FIG. 1, when a message is received by the intercomputer communication facility 57 from the interface 14, the message has arrived at the local computer hosting the recipient application process. Accordingly, the message is sent via a path 210 to a routing data function 211 for putting an envelope of routing data around the message. Accordingly, the function 211 consults the registration table 96' via a path 212 to obtain the MultiBus II PID of the recipient process associated with the process name. The addressed message is directed to the intracomputer communication facility 55 via a path 213 from which facility the recipient process can retrieve its message. In a manner similar to that described above, the recipient process uses the RECEIVE function 95' for this purpose.

With reference to FIGS. 1–4, when a process on a NIP computer 13 desires to send a message to another NIP 13, the message is transported via the data server computers 11 utilizing the transport mechanisms described above. It is appreciated from the foregoing, that a process registers with IPC to identify itself and identify where it can be found in accordance with the process identification mechanism of the host computer. In that way, IPC can route messages to the process irrespective of the location of the originating process. A process merely registers and IPC creates all of the message transport connections for it. The application does not require knowledge of the underlying transport mechanisms and the various machine interface across which a message is routed. Utilizing the invention, the applications are developed without concern for the machines on which they are running or the physical locations of processes with which they need to communicate.

It is appreciated that the invention may be implemented in software, firmware and the like, as well as in hardware logic.

For the purposes of the appended claims, the term computer(s) is construed to include computer(s) and processor(s) as described above.

While the invention has been described in its preferred embodiment, it is to be understood that the words which have been used are words of description rather than of limitation and that changes may be made within the purview of the appended claims without departing from the true scope and spirit of the invention in its broader aspects.

We claim:

1. In a system of computers interconnected by a network, each computer hosting application processes, said application processes requiring message transport therebetween, each said computer having an operating system with an intracomputer communication mechanism for transporting said messages between application processes on said computer, said network including intercomputer communication mechanisms for transporting said messages between said computers, said system including means for assigning system addresses unique to each said computer, each said application process having a system name, each said application process having a process identification (PID) assigned by the operating system of the computer hosting said process, interprocess communication (IPC) apparatus on each said computer, said IPC being interposed between said application processes hosted on said each said computer and said operating system of said each said computer, said IPC apparatus on at least one of said computers comprising:

an application process interface including a REGISTER function with which an application process registers for sending and receiving messages, said REGISTER function having registration tables, said application process providing its system name, said REGISTER function storing said system name and PID of the registering application process in said registration tables, said application process interface further including a SEND function responsive to a sending process desiring to send a message to a recipient process, said sending process providing the system name and system address of said recipient process to said SEND function, and first local/remote means coupled to said SEND function and responsive to said system address of said recipient process for determining if said recipient process is hosted locally on said at least one of said computers or remotely on another of said computers, if hosted locally, said first local/remote means being operative for accessing said registration tables for determining the PID of said recipient process and attaching said PID to said message and further operative for directing said message and PID to said intracomputer communication mechanism of said at least one of said computers for delivery to said recipient process, if hosted remotely, said first local/remote means being operative for directing said message to an intercomputer communication mechanism in accordance with said system address of said recipient process.

2. The apparatus of claim 1 further comprising:

second local/remote means coupled to at least one of said intercomputer communication mechanisms and responsive to the system address of a recipient process of a remote message received from said at least one of said intercomputer communication mechanisms for determining if said recipient process is hosted locally on said at least one of said computers or remotely on another of said computers, if hosted locally, said second local/remote means being operative for accessing said registration tables for determining the PID of said recipient process and attaching said PID to said message and further operative for directing said message and PID to said intracomputer communication mechanism of said at least one of said computers for delivery to said recipient process, if hosted remotely, said second local/remote means being operative for directing said message to an intercomputer communication mechanism in accordance with said system address of said recipient process.

3. The apparatus of claim 1 wherein said application process interface further includes a RECEIVE function coupled to said intracomputer communication mechanism of said at least one of said computers and responsive to a recipient process desiring to receive a message sent by a sending process, said RECEIVE function operative for obtaining the PID of said recipient process from the operating system of said at least one of said computers and further operative for obtaining messages having said PID of said recipient process attached thereto from said intracomputer communication mechanism of said at least one of said computers.

4. The apparatus of claim 1 wherein said application process interface further includes a DEREGISTER function with which an application process deregisters from sending and receiving messages, said application process providing its system name to said DEREGISTER function, said DEREGISTER function deregistering said application process by deleting its system name and PID from said registration tables.

5. The apparatus of claim 3 wherein said operating system of said at least one of said computers comprises a UNIX operating system and said intracomputer communication mechanism of said UNIX operating system of said at least one of said computers comprises a UNIX mechanism utilizing UNIX message queues, and said IPC on said at least one of said computers is operative to reserve two of said UNIX message queues denoted as a write queue and a read queue, respectively, said write queue being utilized to receive messages originated by said sending process, said read queue being used to deliver a message to said recipient process.

6. The apparatus of claim 5 wherein said write queue is coupled between said SEND function and said first local/remote means, said first local/remote means receiving messages from said write queue and operative, if said recipient process of a message is hosted locally, for attaching said PID to said message and directing said message to said read queue.

7. The apparatus of claim 6 wherein said second local/remote means is operative for directing messages for said locally hosted recipient process to said read queue.

8. The apparatus of claim 5 wherein said RECEIVE function is operative to receive said messages with said PID of said recipient process attached thereto from said read queue.

9. The apparatus of claim 3 wherein said RECEIVE function includes a timeout parameter for controlling how long said recipient process will wait for a message.

10. The apparatus of claim 9 wherein said RECEIVE function with a timeout parameter of zero is operative to receive a message pending in said intracomputer communication mechanism of said at least one of said computers but not to wait for a non-pending message.

11. The apparatus of claim 9 wherein said RECEIVE function with a timeout parameter of maximum is operative to wait indefinitely for a message.

12. The apparatus of claim 1 wherein at least two of said intracomputer communication mechanisms have different message transport protocols and structures with respect to each other and at least two of said intercomputer communication mechanisms have different message transport protocols and structures with respect to each other.

* * * * *